United States Patent
Cho

(10) Patent No.: US 6,751,469 B1
(45) Date of Patent: Jun. 15, 2004

(54) METHOD OF OUTPUTTING A LIST OF INFORMATION IN A PORTABLE CELLULAR TELEPHONE USING A SINGLE FUNCTION KEY

(75) Inventor: Sung-Min Cho, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/538,145

(22) Filed: Mar. 29, 2000

(30) Foreign Application Priority Data

Mar. 30, 1999 (KR) ........................................ 1999-12700

(51) Int. Cl.$^7$ ............................................... H04M 1/00
(52) U.S. Cl. .................... 455/550.1; 455/566; 455/564; 345/817; 345/820
(58) Field of Search .......................... 455/550, 90, 575, 455/403, 73, 566, 564, 550.1; 345/817, 818, 819, 820, 825, 828, 829, 811, 786, 784; 379/127.01, 419, 428.03, 29.1

(56) References Cited

U.S. PATENT DOCUMENTS

| | | | |
|---|---|---|---|
| 5,146,490 A | * | 9/1992 | Beckman ............... 379/112.01 |
| 5,247,565 A | * | 9/1993 | Joglekar et al. ............ 455/564 |
| 5,903,634 A | * | 5/1999 | Wakabayashi et al. . 379/127.01 |
| 6,366,302 B1 | * | 4/2002 | Crosby et al. .............. 345/786 |
| 6,484,027 B1 | * | 11/2002 | Mauney et al. ............. 455/421 |

FOREIGN PATENT DOCUMENTS

CN     1180280 A     4/1998

OTHER PUBLICATIONS

First Office Action of the Patent Office of the People's Republic of China dated Aug. 2, 2002, issued in a counterpart application, namely Patent Appln. No. 00104792.2.

* cited by examiner

*Primary Examiner*—Sonny Trinh
(74) *Attorney, Agent, or Firm*—Dilworth & Barrese, LLP

(57) ABSTRACT

Disclosed is a method of outputting a list of information stored in a memory of a portable cellular telephone, comprising the steps of: determining if a list key arranged in a key input section of the portable cellular telephone is depressed; and outputting the information stored in the memory in such a fashion that the information is listed when the list key is depressed. The portable cellular telephone for implementing the method according to the present invention provides an advantage that once a user depresses only one list key arranged on the key input section of the portable cellular telephone, as a list of telephone number information is simply and easily outputted in order, thereby offering convenience to the user in use of the portable cellular telephone.

4 Claims, 2 Drawing Sheets

METHOD OF OUTPUTTING A LIST OF INFORMATION IN A PORTABLE CELLULAR TELEPHONE USING A SINGLE FUNCTION KEY

BACKGROUND OF THE INVENTION

1. Field of the Invention

The present invention relates to a portable cellular telephone, and more particularly to a method of outputting a list of information stored in a memory of the portable cellular telephone.

2. Description of the Related Art

In general, portable cellular telephones have a function of outputting a list of information previously stored therein so that users can easily search the stored telephone numbers or a list of the latest telephone calls, etc. Conventional methods of instructing execution of such a function include a method in which a user finds a command for outputting the list of information in a menu included in the portable cellular telephone and keys-in the command, and also includes a method in which a user selects and depresses an associated one of a plurality of predetermined function keys associated with the function, etc.

However, it is very troublesome for a user to find the command for outputting the list of information in the menu and to key it in, or to memorize the plurality of different function keys to depress a necessary function key among them according to a variety of functions of the portable cellular telephone.

There is therefore a need in the art for a method in which a user can easily key-in such a list outputting command.

SUMMARY OF THE INVENTION

Therefore, an object of the invention is to provide a method of outputting a list of information, in which a user can easily key-in a command for outputting the list of information in a menu included in a portable cellular telephone.

In accordance with the present invention, this object is accomplished by providing a method of outputting a list of information stored in a memory of a portable cellular telephone, comprising the steps of determining if a list key arranged in a key input section of the portable cellular telephone is depressed; and outputting in list format the information stored in the memory when the list key is depressed.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Reference will now be made in greater detail to the preferred embodiments of the present invention. In the following description of the present invention, numerous specific details, such as concrete process routines, are set forth to provide a more thorough understanding of the present invention. It will be apparent, however, to those skilled in the art that the invention may be practiced otherwise than according to the previously mentioned specific details. The detailed description of known functions and configurations incorporated herein will be omitted when it may make the subject matter of the present invention rather unclear.

A portable cellular telephone of the present invention separately includes a list key for instructing output of a list of information. Once a user depresses the list key, information is outputted in list format, offering convenience to the user. Namely, although a user depresses only one list key, he can instruct output of the list of information.

Figure 1:
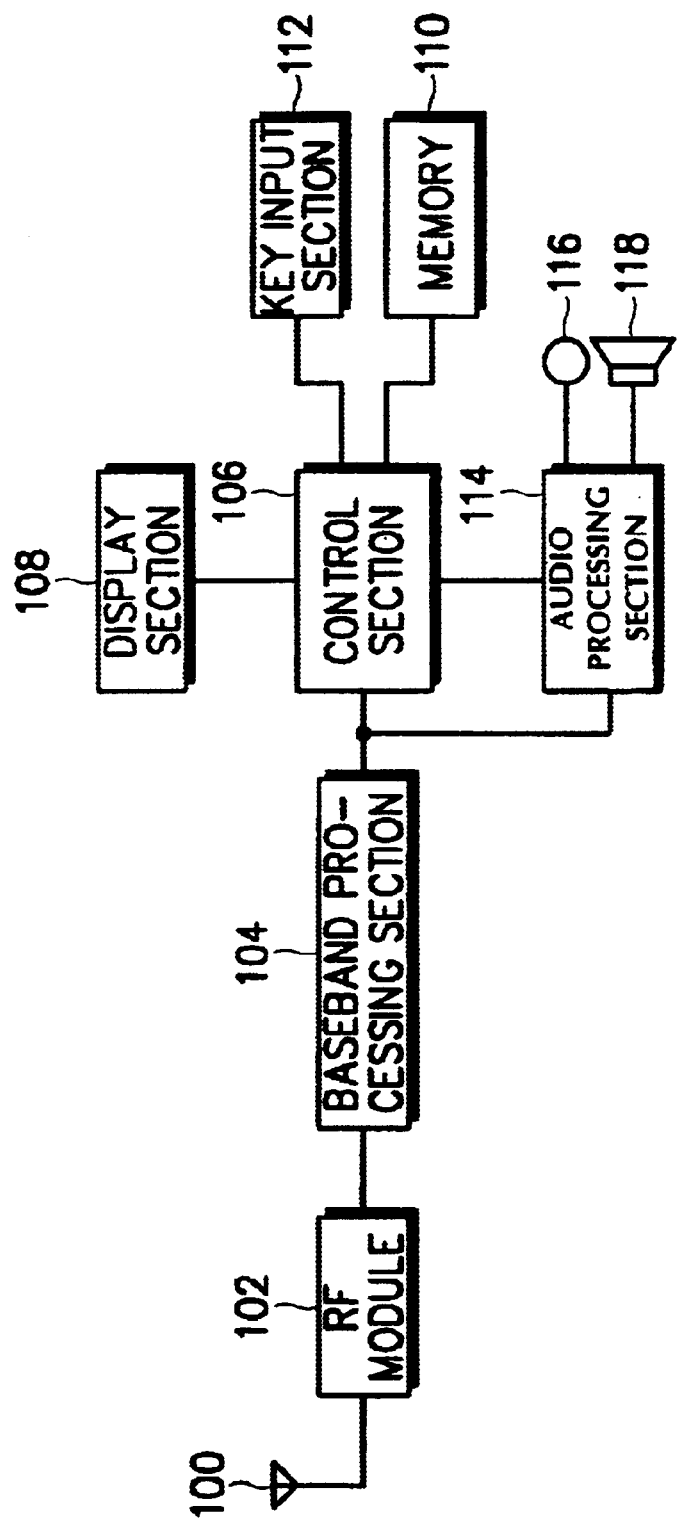
FIG. 1 is a schematic block diagram illustrating the construction of a portable cellular telephone applicable to a preferred embodiment of the present invention.

FIG. 1 is a schematic block diagram illustrating the construction of a portable cellular telephone applicable to a preferred embodiment of the present invention.

Referring to FIG. 1, an RF (Radio Frequency) module 102 and a baseband processing section 104 are shown. A radio-frequency electromagnetic signal is received by an antenna 100 that converts the radio-frequency electromagnetic signal into an electrical signal that is supplied to the RF module 102.

The RF module 102 is adapted to demodulate the radio-frequency electromagnetic signal received from a base station (not shown) through the antenna 100, and to modulate a signal supplied from the baseband processing section 104 to a radio-frequency signal and to transmit the modulated signal to a base station through the antenna 100.

The baseband processing section 104 down-converts in frequency a signal output from the RF module 102 to a baseband frequency. Thereafter, the baseband processing section 104 converts the down-converted signal into a digital signal that is supplied to a control section 106. The baseband processing section 104 also converts a signal outputted from the control section 106 into an analog signal, and, thereafter, up-converts in frequency the analog signal for application to the RF module 102. The control section 106 controls the overall operation of the portable cellular telephone in FIG. 1. In a case where the portable cellular telephone in FIG. 1 employs a CDMA system, a Mobile System Modem (MSM) of QUALCOMM Co. can be used, and in a case where it employs a GSM system, another central processing unit may be used. The control section 166 also allows a list of information stored in a memory 110 to be displayed on a display section 108 when a user depresses a list key arranged on a key input section 112.

The memory 110 consists of a flash memory for storing a process program of the control section 106, a static Random Access Memory (hereinbelow, referred to as "static RAM") for storing a variety of flag information, call-processing information, etc., and an Electrically Erasable and Programmable ROM (hereinbelow, referred to as "EEPROM") for storing setting information such as a power level. The static RAM can store telephone number information including a telephone number and a name for the convenience of a user.

The key input section 112 includes a plurality of keys for keying-in a variety of commands or information, a list key according to a preferred embodiment of the present invention, and an END key. Each key input provides the control section 106 with its associated command. A Liquid Crystal Display (LCD) module may be employed as the display section 108. The control section 106 provides the display section 108 with information to be displayed, and the display section 108 displays the information accordingly.

An audio processing section 114 processes audio data supplied from the baseband processing section 104 into an audio signal, and outputs the processed audio signal to a speaker 118 under the control of the control section 106. The audio processing section 114 also processes an audio signal inputted thereto from a microphone 116 into audio data and supplies the processed audio data to the baseband processing section 104 under the control of the control section 106.

Figure 2:
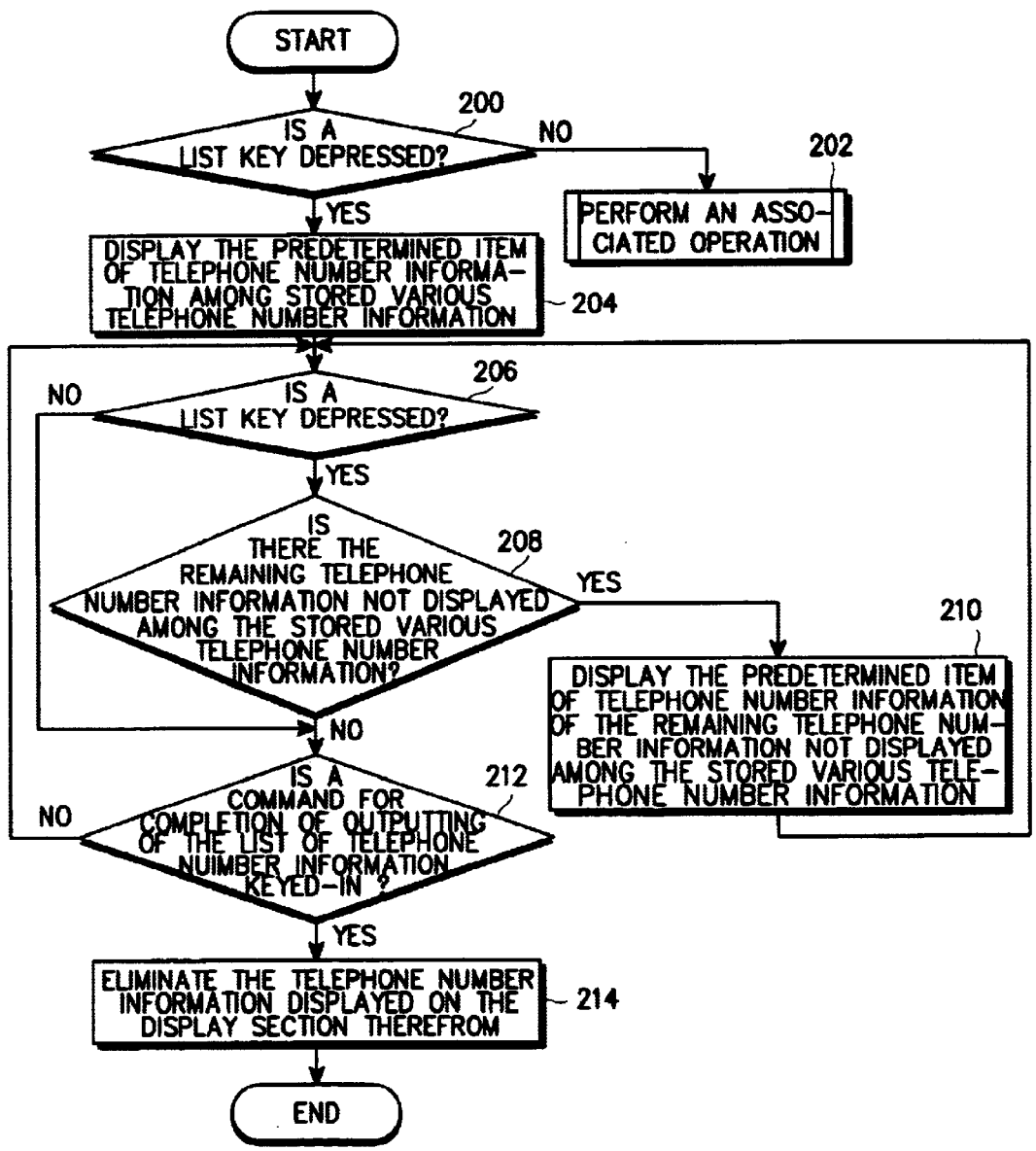
FIG. 2 is a flowchart illustrating the process of outputting a list of information in the portable cellular telephone according to a preferred embodiment of the present invention.

FIG. 2 is a flowchart illustrating the process to output a list of information stored in the portable cellular telephone according to a preferred embodiment of the present invention.

At step 200, the control section 106 determines if a user depresses a list key arranged on the key input section 112. If it is determined at step 200 that the user depresses a key other than the list key, the program proceeds to step 202 where the control section 106 performs an associated operation. If, on the other hand, it is determined at step 200 that the user depressed the list key, the program proceeds to step 204 in which the control section 106 allows the predetermined item of telephone number information among various telephone number information stored in the static RAM of the memory 110 to be read and allows the display section 108 to display the read telephone number information on a screen thereof. Here, the predetermined item of telephone number information can be determined successively by a designer in accordance with the size of the display section 108 of the portable cellular telephone.

When a user attempts to search the next telephone number information after reading the displayed telephone number information, he depresses the list key again at step 206. Meanwhile, when the user does not attempt to search the telephone number information any more, he depresses the END key arranged on the key input section 112 at step 212 of the portable cellular telephone to instruct completion of outputting of a list of various telephone number information.

If displaying of the read telephone number information is completed at the step 204, the program proceeds to step 206 where the control section 106 determines if a user depresses the list key to search the next telephone number information. If it is determined at step 206 that there is input of the list key, the program proceeds to step 208 where the control section 106 determines if there remains any telephone number information which has not already been displayed among the various telephone number information stored in the static RAM of the memory 110. If the answer is YES, or if it is determined at step 206 that there remains telephone number information not already displayed among the stored various telephone number information, the program proceeds to step 210 where the control section 106 allows the predetermined item of telephone number information of the remaining telephone number information not yet displayed among the stored various telephone number information to be read from the static RAM of the memory 110 and allows the display section 108 to display it on a screen thereof. Then, the program returns to the step 206 where the control section 106 performs the subsequent steps.

Meanwhile, if it is determined at step 206 that there is no remaining telephone number information that has not already been displayed, the program proceeds to step 212 where the control section 106 determines if a command for completion of outputting of the list of telephone number information is keyed-in, or a user depresses the END key arranged on the key input section 112 to complete outputting of the list of the telephone number information. If it is determined at step 212 that the command for completion of outputting of the list of telephone number information is keyed-in, the program proceeds to step 214 where the control section 106 allows the telephone number information displayed on the display section 108 to be cleared from a screen thereof. If there is no command for completion, the process returns to step 206.

In a preferred embodiment of the present invention, various information accessible through the use of the list key consists, for example, of telephone number information previously stored in memory by the user, or a list of previously dialed telephone numbers, which offers convenience to the portable cellular telephone user.

As described above, the portable cellular telephone for implementing the list outputting method according to the present invention provides an advantage that once a user depresses only one list key arranged on the key input section of the portable cellular telephone, as a list of various telephone number information is simply and easily outputted in order, thereby offering convenience to the user in use of the portable cellular telephone.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A method of outputting a list of information stored in a memory of a portable cellular telephone using a single list function key, comprising the steps of:

determining if a list key arranged in a key input section of the portable cellular telephone is depressed;

displaying on a display section of the portable cellular telephone, in a unit of a predetermined item, the information stored in the memory when the list key is depressed; and consequently displaying on the display section, in the unit of the predetermined item, the information stored in the memory upon successive depression of the list key.

2. The method according to claim 1, wherein the information comprises stored telephone numbers and names.

3. The method according to claim 1, wherein the information comprises previously dialed telephone numbers.

4. The method according to claim 1, further comprising the steps of:

determining if a command for completion of outputting of the list of information is keyed-in on a key input section of the portable cellular telephone; and clearing the information displayed on the display section of the portable cellular telephone when the command for completion of outputting of the list of information is keyed-in.

* * * * *